United States Patent [19]

Tuda et al.

[11] Patent Number: 4,592,697
[45] Date of Patent: Jun. 3, 1986

[54] GRAVITY BALANCING DEVICE FOR ROCKING ARM

[75] Inventors: Goro Tuda, Kobe; Hironosuke Kada; Teruyoshi Sekino, both of Fujisawa; Yasuhide Nagahama, Kamakura, all of Japan

[73] Assignee: Kabushiki Kaisha Kobe Seiko Sho, Kobe, Japan

[21] Appl. No.: 488,721

[22] Filed: Apr. 26, 1983

[51] Int. Cl.$^4$ ............................................. B25J 19/00
[52] U.S. Cl. ..................................... 414/719; 901/48; 267/71
[58] Field of Search ................. 414/719, 673; 901/48; 267/71

[56] References Cited

U.S. PATENT DOCUMENTS

| | | | |
|---|---|---|---|
| 2,995,327 | 8/1961 | Wood | 267/71 X |
| 3,148,870 | 9/1964 | Suommo | 267/71 X |
| 3,151,857 | 10/1964 | Falkenberg | 267/71 |
| 4,359,308 | 11/1982 | Nakajiima | 414/719 |
| 4,383,455 | 5/1983 | Tuda et al. | 901/48 X |
| 4,500,251 | 2/1985 | Kiryu et al. | 414/719 |

FOREIGN PATENT DOCUMENTS

| | | | |
|---|---|---|---|
| 848350 | 7/1981 | U.S.S.R. | 901/48 X |
| 861061 | 9/1981 | U.S.S.R. | 901/48 X |

*Primary Examiner*—Terrance L. Siemens
*Attorney, Agent, or Firm*—Oblon, Fisher, Spivak, McClelland & Maier

[57] ABSTRACT

A gravity offsetting device for offsetting the gravitational moment of a rocking arm, mounted between a fixed point located above a pivotal point of the rocking arm at a predetermined distance a and substantially in vertical alignment therewith, and an arbitrary point on the rocking arm, the gravity balancing device including: a compression spring having a spring constant k of a value corresponding to the load W at the arbitrary point as divided by the distance a, and a free length corresponding to the sum of the length l between the fixed and arbitrary points and the initial set length $l_s$ of the compression spring, and adapted to apply a counterbalancing tensile force varying in proportion to the distance between the fixed and arbitrary points.

5 Claims, 21 Drawing Figures

GRAVITY BALANCING DEVICE FOR ROCKING ARM

BACKGROUND OF THE INVENTION

1. Field of the Invention

This invention relates to a gravity balancer for a pivotal arm, and more particularly to a gravity balancing device for offsetting the gravitational moment of a rocking arm of a multi-articuate, teaching-playback type robot.

2. Description of the Prior Art

When operating a multi-articulated robot by electric or hydraulic motors, the major portion of the driving forces of these motors is consumed for offsetting the gravitational moments of the respective pivotal or rocking arms of the robot. Of course, such gravitational moment is desired to be reduced to a minimum, and in this regard it has been the conventional practice to resort to a balancing mechanism using a tension spring, a model arrangement of which is shown in FIG. 1.

Figure 1:
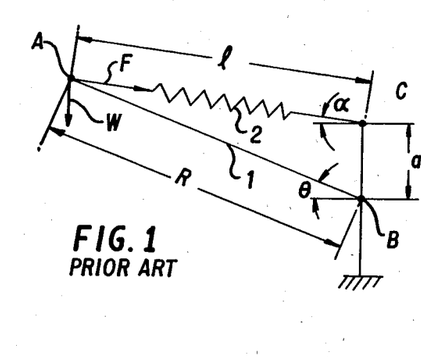
FIG. 1 is a schematic showing the principles of the conventional balancing mechanism using a tension spring.

In FIG. 1, indicated at 1 is an arm which is rockable about a a fixed pivotal point B, and at 2 a tension spring which is tensioned between a fixed point C located upwardly at a small distance a from the pivotal point B in vertical alignment therewith. Now, in a case where the distance between the two points A and B is R, the current length of the tension spring 2 is l, the load acting on the point A of the arm 1 is W, the tensile force of the spring 2 at the point A is F, the angle of the arm 1 with the horizontal line is $\theta$, and the angle of the tension spring 2 with the horizontal line is $\alpha$, the gravitational turn-over moment $M_1$ of the pivoting arm 1 about point B is expressed by the following equation.

$$M_1 = WR \cos \theta \quad (1)$$

On the other hand, the moment $M_2$ which is caused by the tension spring 2 is expressed by the equation $$M_2 = Fa \cos \alpha \quad (2)$$

In this instance, if the free length of the tension spring 2 is L and the spring constant is k, the tensile force F is expressed by the following equation:

$$F = k \cdot (l - L) \quad (3)$$

Figure 2:
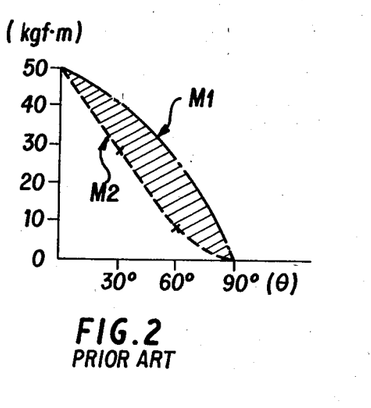
FIG. 2 is a graphic representation of the overbalancing gravitational moment.

Plotted on the graph of FIG. 2 are the curves of $M_1$ and $M_2$, by applying practical values of W=50 (kgf), R=1000 (mm), k=1 (kgf/mm) and a=200 (mm). In this graph the horizontal axis represents the angle of inclination $\theta$ of the arm, the vertical axis represents the moment (kgf·m) about point B, and the solid and broken lines indicate the gravitational moment $M_1$ and the moment $M_2$ caused by the tension spring 2, respectively. In this case, the free length L of the spring 2 is so determined as to balance the arm at $\theta = 0°$ and 90°.

In the graph of FIG. 2, the hatched area indicates the umbalancing gravitational force which amounts to 16 kgf·m maximum. As is clear therefrom, the conventional arrangement using a tension spring 2 can approximately balance the arm but is unable to maintain a completely balanced state. Namely, in FIG. 1, firstly with regard to the lengths of the arm and spring, such have a relationship as expressed by the following equation:

$$l \cos \alpha = R \cos \theta \quad (4)$$

Therefore, $M_1 = M_2$ is the condition of the perfect balance, and, from equation (1) and (2), $$WR \cos \theta = Fa \cdot (R/l) \cos \theta$$

$$R \cos \theta (W - a \cdot (F/l)) = 0 \quad (5)$$

In equation (5), R and $\cos \theta$ do not necessarily take a value of 0, and the condition of perfect balance is $$W - a \cdot (F/l) = 0 \quad (6)$$

in which W and a are constants, so that $$F/l = W/a: \text{constant}$$

Namely, it is necessary to satisfy the condition of F∞l. In other words, perfect balance cannot be achieved unless a tensile force F proportional to the length l is applied. However, the tension spring 2 has no tensile force in the closed length so that it is impossible to satisfy F=0 when l=0. This is the reason why the conventional mechanism is unable to perfectly balance the rocking arm.

A system which perfectly balances with the gravitational moment of a pivotal arm is required in the so-called direct teaching phase in which an operational movement is taugth by gripping the fore end of the robot arm in a power-off state. Needless to say, although it is desired that a robot arm can be moved lightly irrespective of the direction of movement when a multi-articulate arm is manually operated, the robot arm itself generally has a relatively large weight which is easy to lower by difficult to lift up. As a matter of fact, it hinders smooth manual teaching operation, and requires unnecessary torques of the servo control, coupled with the problem of low positioning accuracy in the playback phase.

SUMMARY OF THE INVENTION

With the foregoing difficulties and problems in view, the present invention has as its object the provision of a novel gravity balancing mechanism for balancing the weight of a rocking arm irrespective of the angle of inclination of the arm.

More specifically, it is an object of the present invention to provide a gravity balancing device particularly suitable for a rocking arm of a robot, employing a compression spring which is arranged to nearly perfectly offset the gravitational moment of such arm.

It is another object of the present invention to provide an industrial robot, employing in addition to the above-mentioned balancing device a rotary drive system incorporating a clutch on the output side of a reducer for releasably coupling with the reducer a driven part of the robot such as a rocking arm or a wrist portion attached to a working end of a rocking arm.

It is a further object of the present invention to provide a multi-articulated industrial robot, having the above-mentioned gravity balancing device mounted on each one of its first and second arms and fixedly provided with a counterweight on the pivoting shaft of the second arm to offset the variations in the gravitational moment of the second arm caused by rotation of a wrist portion attached to the fore end of the second arm.

According to a fundamental aspect of the present invention, there is provided a gravity offsetting device for offsetting the gravitational moment of a rocking arm, mounted between a fixed point located above a pivotal point of the rocking arm at a predetermined distance a and substantially in vertical alignment therewith, and an arbitrary point of the rocking arm, the gravity balancing device comprising a compression spring having a spring constant k of a value corresponding to the load W at the arbitrary point as divided by the distance a, and a free length corresponding to the sum of the length l between the fixed and arbitrary points and the initial set length $l_s$ of the compression spring, and adapted to apply a counterbalancing tensile force varying in proportion to the distance between the fixed and arbitrary points.

The above and other objects, features and advantages of the present invention will become apparent from the following description and the appended claims, taken in conjunction with the accompanying drawings which show by way of example some illustrative embodiments of the invention.

DETAILED DESCRIPTION OF THE PREFERRED EMBODIMENTS

Figure 3:
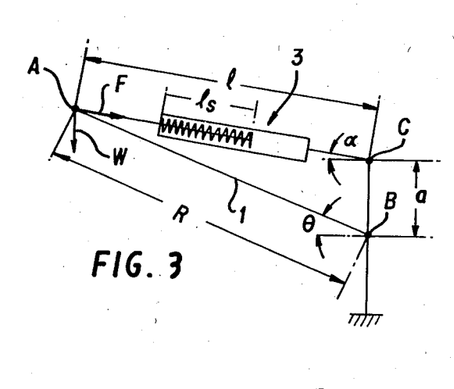
FIG. 3 is a schematic view illustrative of the principles of the balancing mechanism according to the present invention.
Figure 4:
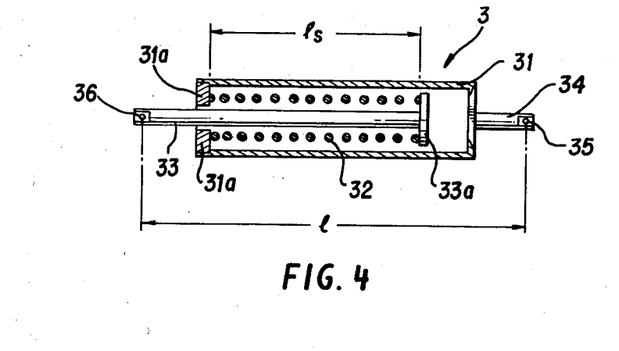
FIG. 4 is a schematic view of a basic construction of the gravity balancing spring unit embodying the present invention.

Referring first to FIG. 3', there is schematically shown an embodiment of the invention for the explanation of the operational principles, in which indicated at 3 is a gravity balancing mechanism (hereinafter referred to as "a spring unit") for an arm which is pivotable about a fulcrum point B. The spring unit 3 has a construction similar to a hydraulic cylinder, as shown particularly in FIG. 4, including a cylindrical case 31, a compression spring 32 provided in the case 31, a movable rod 33 which is protrudable out of the case 31 through one end face thereof, and a fixed rod 34 which is secured to the outside of the other end face of the case 31. The compression spring 32 is interposed and supported between a lid member 31a forming one end face of the case 31 and a flange portion 33a formed at the inner end of the movable rod 33. Denoted at 35 is a joint portion of the fixed rod, corresponding to the point C which is located above the fulcrum point B at a distance a and in vertical alignment therewith, at 36 a joint portion of the movable rod corresponding to the point A on the arm. These joint portions 35 and 36 are fixed to the points C and A, respectively, relative to the arm 1 which is in the initial posture as shown in FIG. 3. The distance $\overline{(AC)}$ between the joint portions 35 and 36 in the initial posture is l, which is a predetermined value. With the distance l, the compression spring is set within the length $l_s$.

With regard to the constant of the compression spring 32 (which is determined by the method as will be described in detail hereinlater), a spring constant $k = W/a$ is selected according to the theoretical formula given above. On the other hand, the free length L is so selected as to be $L = l + l_s$. The manner in which perfect balance of the arm is achieved by the spring unit of the above-described arrangement is now explained with reference to the schematic of FIG. 3.

If the arm 1 is swung counterclockwise from the initial position of FIG. 3, increasing the distance AC to $l_x$ by an increment of $\Delta l$, the compression spring is compressed by $\Delta l_s$ to have a length of $l_{sx}$. In this instance, the pulling force $F_x$ which is applied by the gravity balancing mechanism 3 at the point A of the arm is $$F_x = (L - l_{sx}) \cdot k \quad (7)$$
$$= \{(l + l_s) - (l_s - \Delta l)\} \cdot k$$
$$= (l + \Delta l_s) \cdot k$$

Since the rods 33 and 34 are rigid and have no elasticity, $$\Delta l_s = \Delta l \quad (8)$$

By substituting Eq. (8) into Eq. (7), we obtain $$F_x = (l + \Delta l) \cdot k = l_x \cdot k$$

and thus $$(F_x/l_x) = k = (W/a)$$

which satisfies the condition of perfect balance. In other words, the rocking arm 1 can be balanced at an arbitrary position irrespective its angle of inclination $\theta$, so that it becomes possible to stop or move the arm at any arbitrary position with almost no external force aid.

Figure 5:
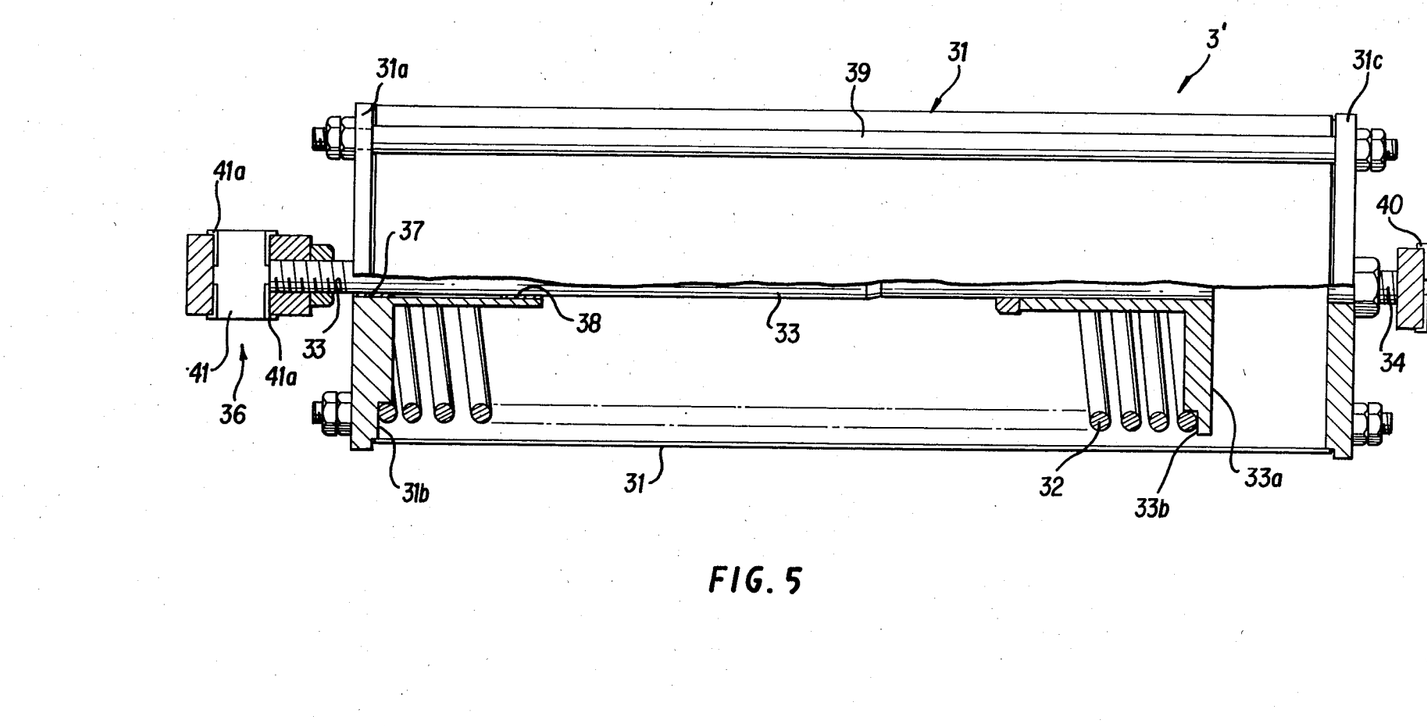
FIG. 5 is a schematic view showing the gravity balancing spring unit of the invention in greater detail.

The construction and essential component parts of the spring unit 3' is shown more particularly in the enlarges schematic section of FIG. 5. As seen therefrom, the movable rod 33 is extended through a bore 37 which is formed in the lid member 31a and supported by a bearing 38 provided around the inner periphery of the bore 37. The compression spring 32 is interposed and supported between a stepped portion 31b on the back side of the lid member 31a and a stepped portion 33b on a flange portion 33a. The body of the cylindrical case 31 which serves as a winding barrel for the compression spring 32 is formed to be of a rectangular shape in section. More specifically, it is formed by assembling four plates on its four sides, and lid members 31a and 31c are fitted at the opposite end thereof and fixed in position by tightening nuts on opposite ends of screw rods 39 which are passed through the respective lid members 31a and 31c.

The stationary rod 34 with the joint portion 35 is threaded into the lid member 31c and fixed thereto by a stop nut. The joint portion 36 is threaded into the fore end of the movable rod 33 and fixed thereto by a stop nut. The joint portions 35 and 36 are formed with holes 40 and 41 for receiving shaft portions of the structures to be attached thereto, and fitted with flanged bushes 40a and 41a, respectively. Although the cylindrical case 31 has been shown and described as being of a rectangular shape in section, such may be formed of a circular cylinder shaped if desired.

In designing the spring unit 3, it becomes necessary to change the specifications thereof depending on the kind of arm utilized, and the respective spring constants are determined in the following manner. (1) For determination of the constant k: the load W is obtained from the weight calculation, and the distance a is given by the mounting structure. It is expressed by $k=W/a(kg/mm)$. The mounting or setting length l of the spring unit 3 is determined by the arm, and is set between the minimum value of $l(\theta=90°)$ and the maximum value of l as determined by the movable range $\theta$ of the arm. (2) From the spring constant k, the dimensions of the spring are determined, including the wire diameter d (mm), coil diameter D (mm) and the number of turns N. However, as the values of d, D and N are not determined simply be a particular constant k, suitable values are selected from the standpoint of designing. (3) The closed length of the spring is determined since the mounting length $l_s$ of the spring has to be greater than the closed length. (4) The free length L of the spring is determined from $L=l+l_s$ in which the length $(l+l_s)$ structurally becomes a constant value in all cases.

Now, the description is directed to the adjustment of the spring unit 3. In the actual production of the above-described spring unit, there arise errors in the manufacturing process, with deviations from the theoretical calculations. More specifically, with regard to the mounting length of the spring and distance a between the pivotal point and the mounting position of the spring unit, the error in the machining stage is less than 0.1%. With respect to the load W, there occurs almost no error in the case of machined parts but it is necessary to estimate an error of several percent in the case of cast parts with untreated casting skin. With regard to the tensile force F, it is necessary to take into consideration the variations in the free length L as well as variations in the spring constant k due to variations in the coil diameter D and wire diameter d. For these variations, it is necessary to estimate also an error of several percent.

Following are three exemplary means of fine adjustment.

Figure 6:
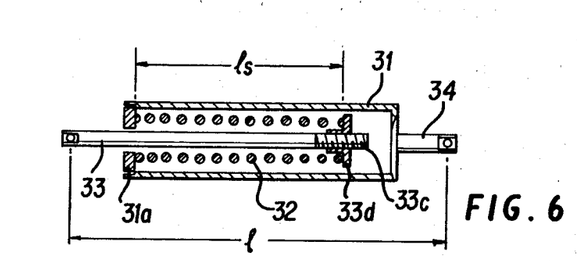
FIG. 6 is a schematic view explanatory of the means for adjusting the length l of the spring.

The first one is the means for adjusting the spring length $l_s$, which, as shown in FIG. 6, consists of a screw portion 33c formed on the inner end portion of the movable rod 33 and an internally threaded flange-like spring seat 33d threaded on the screw portion 33c. With this arrangement, the spring length l can be varied by turning the spring seat 33d, namely, the tensile force F can be adjusted by varying the spring length $l_s$ without changing the mounting length of the spring unit 3.

Figure 7A:
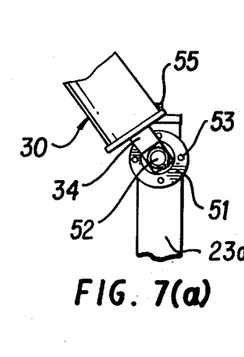
FIGS. 7(a) and 7(b) are schematic views explanatory of the means for adjusting the length l of a spring unit.
Figure 7B:
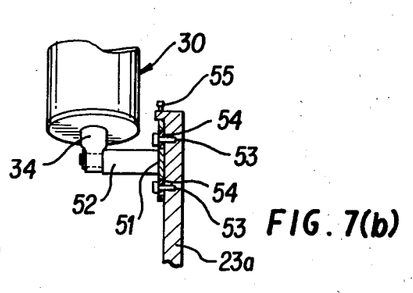

The second one is the means for offsetting variations in the ratio F/l or the spring constant k by adjusting the distance a. More specifically, as shown in FIGS. 7(a) and 7(b) which are fragmentary schematic and sectional views of the lower mounted portion of the spring unit 3, the stationary rod 34 is rotatably supported on a shaft 52 with a flange 51 which is securely fixed in position by a number of screws 53. The holes which are provided in the flange 51 for receiving the screws 53 are formed in vertically elongated slots 54 to permit the adjustment of the distance a. Preferably, the upper end of the fixed table 23a is bent in the shape of an inverted L-shape to provide an adjusting screw 55 in the bent portion to thereby fixably slide the flange 51 along the top surface of the fixed table 23a for adjustment of the distance a. This arrangement has an advantage in that fine adjustment becomes possible. Normally, the movable range of adjustment suffices to be several percent of the preset distance a, and may be +5-+10 (mm) in a case where a=200 (mm).

Figure 8:
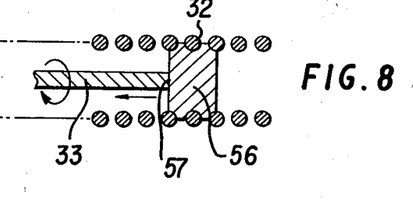
FIG. 8 is a schematic view explanatory of the means for adjusting the spring constant k.

The third one comprises means for adjusting the spring constant k, the major components of which are illustrated in section in FIG. 8. This adjusting means includes a cylindrical member 56 which is provided at the inner end of the movable rod 33 and formed with a female screw conforming with the inner shape of the compression spring 32 to hold the movable rod 33 in threaded engagement with the compression spring 32. As the movable rod 33 is turned in the arrowed direction, the cylindrical member 56 is displaced leftward from the position shown in FIG. 8. This reduces the number of turns of the compression spring 32 between the lid member 31a of the casing 31 and the rod end 57. As a result, the spring constant k which is proportional to the number of turns is increased. If the movable rod is turned in the reverse direction, the spring constant k is minimized. Of course, the above-mentioned means of fine adjustment may be employed singly or in a suitable combination depending upon the circumstances.

The above-described spring unit 3 is particularly suitable for balancing the pivoting arm of a multi-articulated robot as exemplified in the following examples of application.

Figure 9:
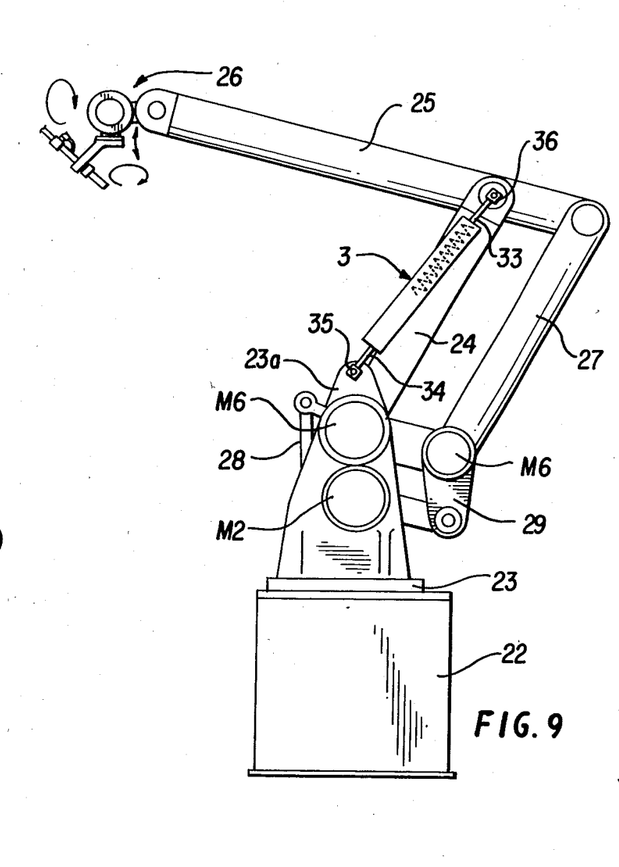
FIG. 9 is a schematic side view of a multi-articulate robot incorporating the gravity balance spring unit according to the present invention.

FIG. 9 shows in side view the gravity balancer of the present invention as applied to a multi-articulated robot 20 with a parallelogrammic link mechanism. The robot 20 includes a box portion 22, a swivel base 23, a first arm 24, a second arm 25, a wrist portion 26, an upper arm link 27, a parallel link 28 for the first arm 24, and a parallel link 29 for the second arm 25. The robot 20 is provided a number of motors M, one for each shaft thereof, for example, a first arm motor M2 drives the first arm 24 by operating a lever of the parallel link thereby actuate a lever which is fixed to the first arm 24 through the parallel link 28 for the first arm. The second arm motor M3 which is mounted on the side away from the first arm motor M2 (i.e., on the back side of the figure) drives the second arm 25 by operating a lever of a parallel link to move the upper arm link 27 of another parallel link through the parallel link 29 for the second arm. Motor M4 (and motor M5 on the opposite side) and motor M6 correspond to the three shafts of the wrist portion 26. Although not shown, motor M1 is provided for the swivel base 23.

In this example of application to the robot of the above-described construction, the spring unit 3 which serves as a gravity balancing device is provided on the first arm 24. The joint portion 35 at the fore end of the fixed rod 34 is attached to the upper end of an upwardly extending fixed frame 23a which is provided integrally with the swivel base 23, while the joint portion 36 at the outer end of the movable rod 33 is attached to the upper end of the first arm 24 to thereby constantly apply a tensile force to the upper end of the first arm 24.

Figure 10:
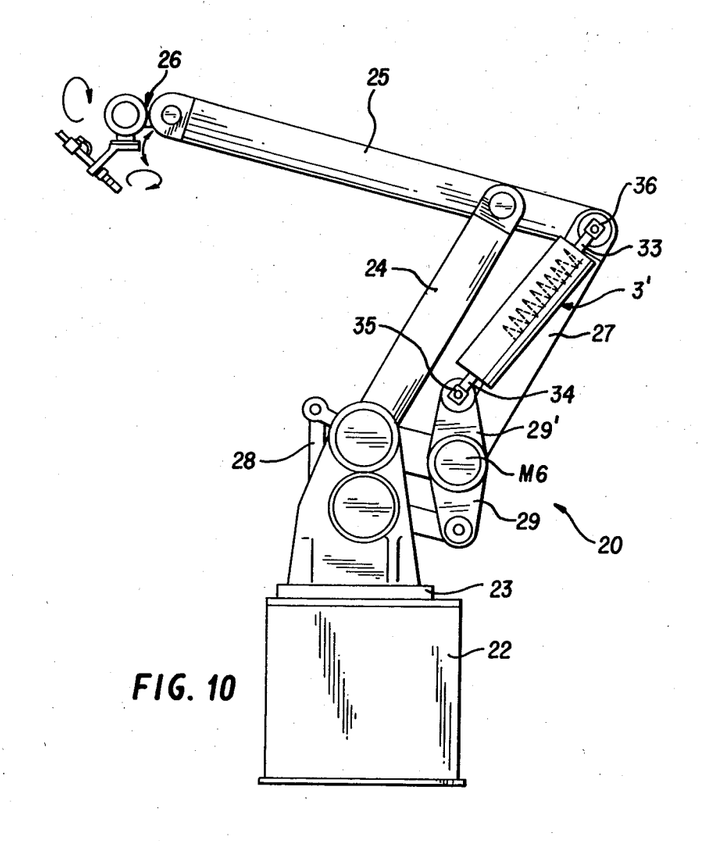
FIG. 10 is a view similar to FIG. 9 but showing another form of application of the gravity balancing spring unit of the invention.
Figure 11:
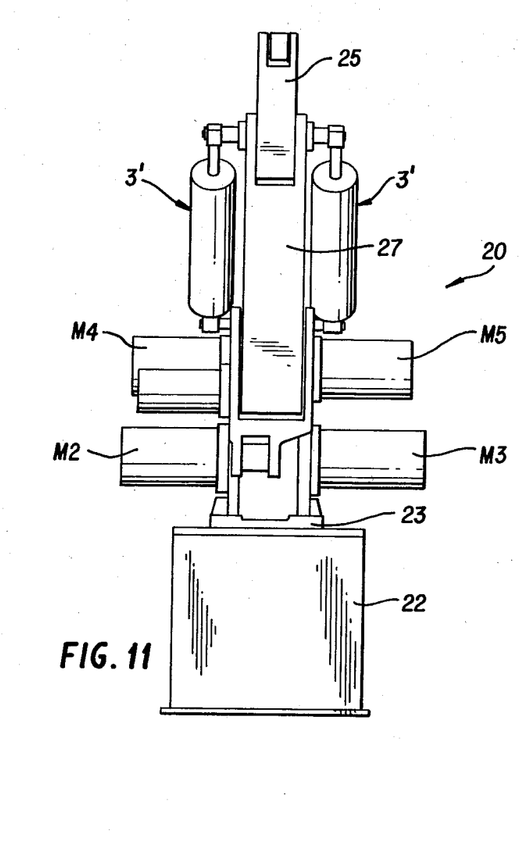
FIG. 11 is a rear view of the robot of FIG. 9.
Figure 12:
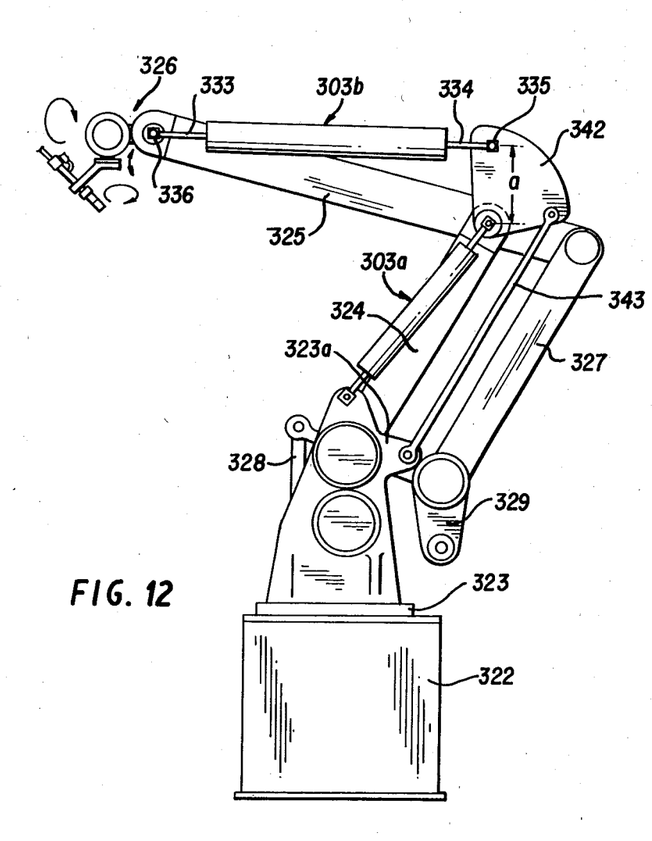
FIG. 12 is a side view of still another example of application.

FIGS. 10 and 11 are side and rear views of another example of application, in which the spring unit 3' is provided on the upper arm link 27 of an industrial multi-articulate robot. More particularly, the fixed rod 34 of the spring unit 3' is attached to an upper extension 29' of the parallel link 29 of the second arm, while attaching the movable rod 33 of the spring unit 3 to the joint portion of the second arm 25 and the upper link 27. In this case, the distance a along a vertical line is the distance between the shaft of the motor M6 and the joint portion 35 of the fixed rod 34.

When the spring unit 3' is mounted in this manner, it has the effect of offsetting the moment caused by the weight of the upper arm link 27 as well as the gravitational moment of the first arm 24. The weight ($W_1$) of the spring unit 3' itself has a secondary effect of acting as a counterbalance of the second arm 25 about the joint of the second arm 25 and the first arm 24. Preferably, a pair of spring units are mounted symmetrically as shown in FIG. 11 from the viewpoint of balance and the effect of design. Of course, the spring constant k is $\frac{1}{2}$ of the calculated value which is given hereinabove. The symmetrical arrangement of a pair of spring units 3' is also applicable to the embodiment of FIG. 9.

As for another modification the spring unit may be mounted on both the first arm 24 and the upper arm link 27 if desired.

Figure 13:
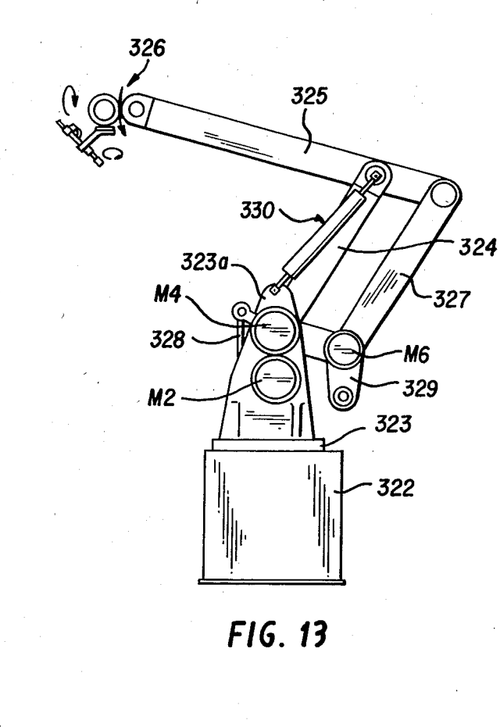
FIG. 13 is a side view of a further embodiment of the invention.

FIG. 13 illustrates a further embodiment of the present invention, employing a pair of spring units (two pairs in the case of the symmetrical arrangement), namely, a spring unit 303a for the first arm and a spring unit 303b for the second arm. The spring unit 303a for the first arm is mounted in the same manner as in the embodiment of FIG. 9.

The spring unit 303b for the second arm has the joint portion 335 of the fixed rod 334 rotatably supported at one end of a triangular plate 342 and the joint portion 336 of the movable rod 333 rotatably supported at the joint of the second arm 325 and the wrist portion 326. The triangular plate 342 is supported by a link 343 which is pivotally connected at one end to the first arm 324 and fixed frame 323a and extends parallel with the first arm 324, so that it will not be tilted upon rotation of the first arm 324. The vertical distance a for the second arm 325 is the distance between the joint portion 335 of the second arm spring unit 303b on the triangular plate 341 and the point of connection of the first and second arms 324 and 325. These two points are constantly maintained in vertical alignment with each other by the parallel link mechanism irrespective of the rotational movements of the second arm 325.

In the case where a spring unit 3' is applied to each arm of the robot, it becomes possible to attain perfect balancing of the respective arms at the time of direct teaching.

In the foregoing embodiments, the spring unit is preferably mounted at the center of gravity of the arm if possible. Further, although it is the best to locate the joint portion 335 of the spring unit upward of and in vertical alignment with the pivotal point of the arm, there occur no problems in actual operation and the objects of the invention can be attained even if the joint portion 335 is located in a slightly offset position, failing to align exactly with the pivotal point in the vertical direction.

In addition to the provision of the gravity balancing spring unit or units, the industrial multi-articulated robot is preferred to employ an electric motor as a drive source for the respective arms in view of the ease of control and the detection of speed and position thereof.

Referring to FIG. 13, there is shown a similar multiarticulated robot of the construction with the spring unit 330 mounted on the first arm 324 to offset the gravitational moment which acts on the upper end of the first arm 324 due to the weight of the wrist portion 326 and the first and second arms 324 and 325 in the same manner as described hereinabove. The arrangement of the drive system employed in this embodiment is illustrated in FIG. 14, including a motor M having the output shaft thereof coupled with a reducer 341, a clutch 344 for releasably coupling the output shaft 342 of the reducer 341 to a driven part 343, and a pulse encoder 349 connected to a shaft 345 on the follower (output) side of the clutch 344 through a gear train 346 (consisting of a pair of spur gears 347 and 348 in the particular example shown), the pulse encoder 349 serving as a position detector.

Figures 14, 15, 16:
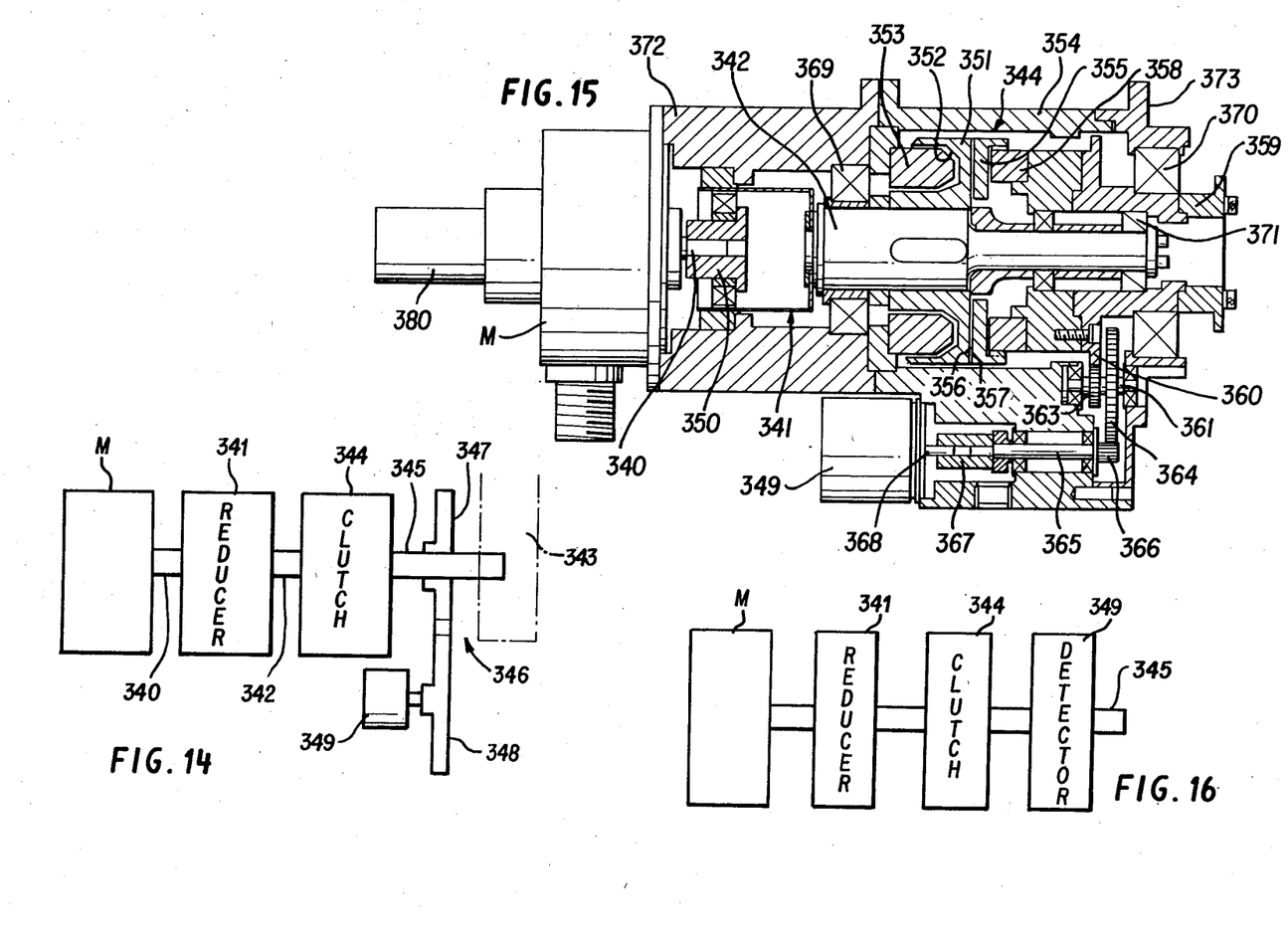
FIG. 14 is a block diagram of a rotary drive mechanism employed in the embodiment of FIG. 13.
FIG. 15 is a diagrammatic sectional view of the rotary drive mechanism.
FIG. 16 is a block diagram showing a modification of the rotary drive mechanism.

The above-mentioned drive system is now described more particularly with reference to FIG. 15. The output shaft 340 of a DC servo motor M is coupled with a coaxial type reducer 341 (e.g., a reducer with a commercial name "Harmonic Drive", a product of Harmonic Drive Systems). The output shaft 342 of the reducer 341 is coupled with the drive side of an electromagnetic clutch 344. The drive member 51 is provided with an annular cavity 352 to receive an electromagnetic coil 353 which is fixed in a case 54 of the electromagnetic clutch 344. Indicated at 355 is a follower member of the electromagnetic clutch 344, which is connectible with the drive member 351 through claws 356 and 357 which are provided on the opposing faces of the drive and follower members 351 and 355 and intermeshed as the follower member 355 is attracted by the electromagnetic coil 353 upon energization thereof. In order to permit axial movement of the follower member 355 at this time, such is splined on a support member 358 integrally fixed by screws to an output sprocket 359 which transmits the driving force to the driven part 343 and to a spur gear 360 which transmits the rotation to the pulse encoder 349. The spur gear 360 transmits the rotational force to a pinion 366 on a shaft 365 in cooperation with a spur gear 363 on a shaft 361 through an intermediate gear 364 which is coaxial with the shaft 361. The shaft 365 is connected to a shaft 368 of the pulse encoder 349 by a coupling 367. In FIG. 15, indicated at 369 is a bearing for supporting the output shaft 342 of the reducer 341, at 370 a bearing for supporting the shaft of the sprocket 359, and at 371 a bearing for the follower member 355 of the clutch 344. Further, designated at 372 is a casing of the reducer 341, at 373 a casing for supporting the sprocket 359, and at 380 a tacogenerator serving as a speed detector and directly connected to a shaft located on the side away from the output shaft 340 of the motor M. With this sort of rotational drive system, it becomes possible to simplify the construction of the detection means (for picking up the data of position, speed and the like).

The construction of the drive system shown in FIG. 15 is intended for the drive of the wrist portion 326 (FIG. 13) and employs a sprocket 359 for the output shaft 345 to transmit the driving force by a chain. However, in the case of a drive system for the arm 324 or 325 or the swivel base 323, the sprocket 359 is replaced by a shaft with or without a lever. The gear train which is used in the above-described drive system for transmitting the rotation of the follower member 355 of the clutch 344 to the shaft 368 of the pulse encoder 348 may be substituted by a belt or a chain if desired. Further, although the rotational speed of the sprocket shaft 359 is increased by several tens times through the transmission gears 360, 363 and 364 in the construction shown in FIG. 15, the power transmitting means preferably has a speed-up ratio which is comparable to the reduction ratio of the reducer 341. If desired, the pulse encoder 349 may be replaced by a resolver in the form of an AC exciting type angle detector. Moreover, there may be employed a friction type or hydraulic or powder clutch instead of the above-described tooth type electromagnetic clutch. Likewise, the reducer is not restricted to the coaxial type shown in FIG. 15 and may be replaced by a reducer of any other type.

FIG. 16 illustrates another example of the rotational drive mechanism sequentially connecting a motor M, a reducer 341, a clutch 344 and a position detector 349. In this case, a coaxial type position detector 349 is located behind the clutch 344 wherein the speed-up ratio is 1. Therefore, the position detector 349 is required to have a higher resolution power than in the construction shown in FIG. 14, but is free of the adverse effects accruing from backlashes or errors in the transmission means. Since a detector of a relatively high resolution power is used, it becomes possible to ensure higher accuracy of the positional detection as compared with the construction of FIG. 14.

Figure 17:
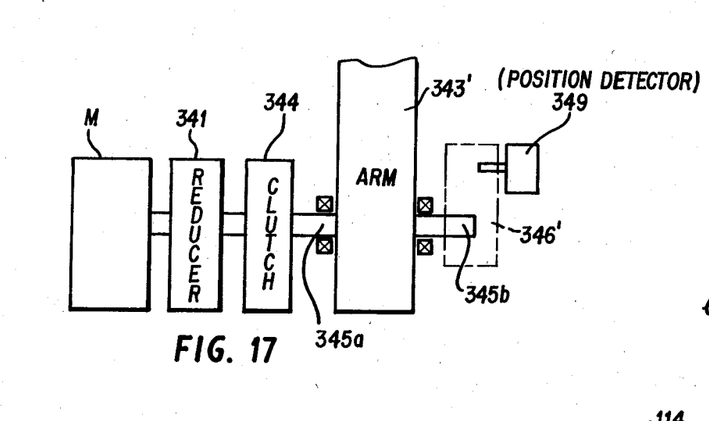
FIG. 17 is a block diagram showing another modification of the rotary drive mechanism.

Referring to FIG. 17, there is schematically shown a further arrangement of the drive system wherein a motor M, a reducer 341 and a clutch 344 are sequentially connected in that order and which is adapted to drive an arm 343' of a robot by the output shaft 345a of the clutch 344. The positional data of the arm 343' are picked up by a position detector 349 which is coupled through a gear train 346' with the end portion 345b of the output shaft 345a which is passed through the arm 343'.

In the above-described drive mechanisms, the motor M is a rotary motor in general, and an electric motor is preferred to hydraulic and pneumatic motors.

In addition to the provision of the gravity balancing mechanism, the driven part is adapted to be releasably driven from a rotary power source through a clutch which is located on the output side of a reducer, so that direct teaching of the robot is possible even in a case where an electric motor or other rotary drive source is used for the drive mechanism. Since the clutch is located in a posterior with respect to the reducer, it becomes possible to preclude the influences of loss torque of the reducer at the time of releasing the clutch. The position detector is coupled with the output shaft in the final stage of the drive mechanism so that there is no possibility of backlash or torsion of the reducer and clutch slippage causing errors with respect to positional detection and the playback operation.

Figure 18:
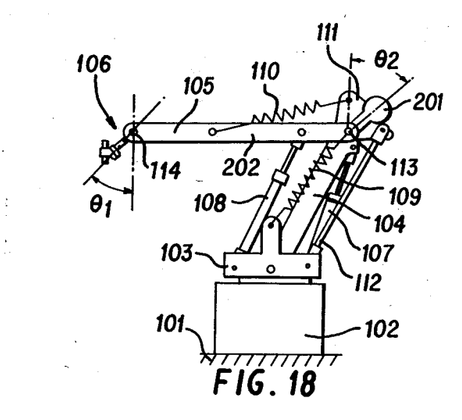
FIG. 18 is a side view of another embodiment employing a counterweight.
Figure 19:
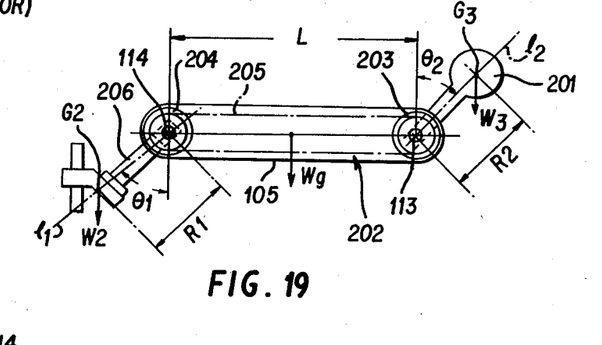
FIG. 19 is a schematic illustration of a parallel link.
Figure 20:
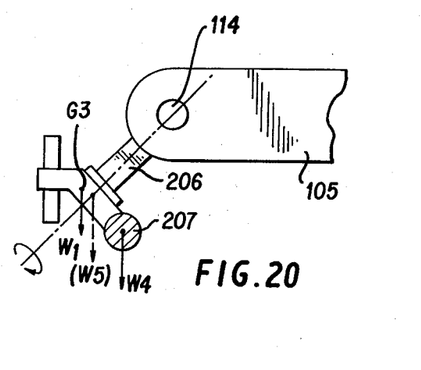
FIG. 20 is a fragmentary side view of a wrist portion with a counterweight.

Referring to FIGS. 18 to 20, there is shown a further embodiment of the present invention, employing in addition to the gravity balancing spring unit a counterweight for offsetting the variations in the gravitational moment of the second arm as caused by variations in the posture of the wrist portion which is attached to the fore end of the second arm. As shown in FIG. 19, a counterweight 201 with a spherical body at one end of a rod is securely fixed to the pivoting shaft 113 of the second arm 105, connecting the pivoting shaft of the wrist portion and the second arm are connected by a parallel link 202 which is provided in the second arm 105 to equalize the angles $\theta_1$ and $\theta_2$. More particularly, as shown in the schematic illustration of FIG. 19, sprocket wheels 203 and 204 are coaxially mounted on the pivoting shafts 113 and 114 of the second arm 105 and the wrist portion 106 at the fore end of the second arm, and a chain 205 is passed around the sprocket wheels 203 and 204 to constitute an interlock between the pivoting shafts 113 and 114 of the second arm 105 and the wrist portion 106, respectively. The rod portion of the counterweight 201 is attached to the pivoting shaft 113 such that the line $l_1$ which passes through the center of gravity $G_2$ of the whole wrist portion 106 and the pivoting shaft 114 is maintained in parallel relation with the line $l_2$ which passes through the center of gravity $G_3$ of the counterweight 201 and the pivoting shaft 113. In FIG. 19, reference character $\theta_1$ denotes an angle of rotation up to the line $l_1$ from a vertical line extending toward the ground through the shaft 114, while reference character $\theta_2$ denotes an angle of rotation up to the line $\theta_2$ from a vertical line extending upwardly through the shaft 113. If the wrist portion 106 is moved by a drive source which is not shown, or by a manual operation (through rotation of the shaft 114), the resulting change in the angle $\theta_1$ is transmitted through the sprocket wheel 204, chain 205 and sprocket wheel 203 to vary the angle $\theta_2$ to the same extent. Consequently, the variation in the gravitational moment of the second arm caused by a change of the posture of the wrist portion 106 is offset by the corresponding rotation of the counterweight 201, but this is applicable only to a situation where the wrist portion 106 has a freedom of movement only in one degree, i.e., rotation about the shaft 114. In a case where the wrist portion 106 has a two degree freedom of movement, for example, when the wrist portion 106 is further rotatable about a welding torch mounting shaft 206 as shown in FIG. 20, it becomes difficult to offset the moment perfectly due to the variation in the angle $\theta_1$ which is caused by the rotation about the shaft 206. This problem can be solved by providing a second counterweight 207 ($W_4$) at a suitable position on the opposite side of the center of gravity $G_3$ relative to the axial line $l_3$ of the shaft 206. By so doing the acting point of the resultant force $W_5$ is located on the axial line $l_3$, and the influences of the rotation about the torch mounting shaft 206 can be removed from the gravitational moment of the second shaft.

Figure 21:
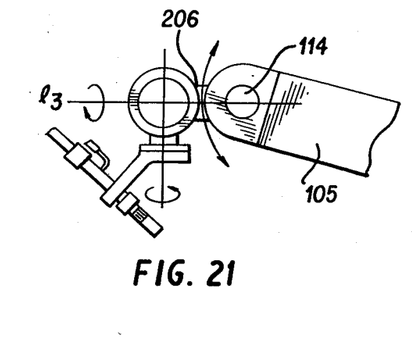
FIG. 21 is a fragmentary side view of a wrist portion with three degree freedom of movement.

Similarly, when the wrist portion 106 has three degree freedom of movement as shown in FIG. 21, the counterweight is mounted in such a manner as to locate the acting point of the resultant force on the axial line $l_3$.

Although a flexible parallel link 202 is employed for interlocking the shafts 113 and 114 in the foregoing embodiment, it may be replaced by a rigid rod-like link, and more than one set of parallel links may be employed if desired. In the latter case, it is possible to replace the counterweight to a lower position at the foot of the robot body, permitting broadening the movable range in addition to the reduction of inertia.

It may be mentioned that the above-described concept of offsetting the gravitational moment by a counterweight is applicable not only to the wrist portion but also to the balancing of the second arm. For example, there may provided on the pivoting shaft 113 a counterweight which offsets the gravitational moment caused by the weight of the second arm itself, of a counterweight which approximately offsets the residual moment which cannot be offset by the balancing spring mechanism. Needless to say, the balancing spring mechanism can be ommited in the former case.

As clear from the foregoing description, according to the present invention, a pivoting arm of a multi-articulated robot can be perfectly balanced by the spring unit, and the variations in the gravitational moment of a second arm caused by rotations of a wrist portion can be offset by the provision of a counterweight or a suitable number of counterweights. This, in combination with the disconnectible rotational drive source, can lessen the burden of an operator in a direct teaching operation of the robot to a considerable degree.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gravity balancing device for offsetting a gravitational moment of a rocking arm, mounted between a fixed point located above a pivotal point of said rocking arm at a predetermined distance a and substantially in vertical alignment therewith, and an arbitrary point on said arm, said gravity balancing device comprising:
    compression spring means having a spring constant k of a value equivalent to a load W at said arbitrary point as divided by said predetermined distance a, and a free length equal to a sum of the length l between said fixed and said arbitrary point and an initial mounted length $l_s$ of said compression spring for applying a counterbalancing tensile force varying in proportion to the distance between said fixed point and said arbitrary point on said arm.

2. The gravity balancing device as set forth in claim 1, wherein said compression spring means further comprises a cylindrical casing, a compression spring, a first fixed wall member with a fixed rod member, and a telescopically movable rod wherein said compression spring is disposed in said cylindrical casing between said fixed wall member with said fixed rod member with a joint portion corresponding to said fixed point and a flanged inner end of said movable rod wherein said movable rod is telescopically movable into and out of said casing through a second end wall thereof.

3. An industrial robot incorporating a spring unit for counterbalancing gravitational moment of a rocking arm between a fixed point located above a pivotal point of said rocking arm at a predetermined distance a and substantially in vertical alignment therewith, and an arbitrary point on said arm, said gravity balancing device comprising:
    compression spring means having a spring constant k of a value equivalent to the load W at said arbitrary point and divided by said predetermined distance a, and a free length equal to a sum of the length l between said fixed point and said arbitrary point on said arm and an initial mounted length $l_s$ of said compression spring, for applying a counterbalancing tensile force varying in proportion to the distance of said fixed point and said arbitrary point on said arm.

4. The industrial robot as set forth in claim 3, wherein said compression spring means further comprises a compression spring, a cylinder casing, a first fixed wall member with a fixed rod member, and a telescopically movable rod wherein said compression spring is disposed in said cylindrical casing between said fixed wall member with said fixed rod member with a joint portion corresponding to said fixed point and a flanged inner end of said movable rod and wherein said movable rod is telescopically movable into and out of said casing through a second end wall thereof.

5. The industrial robot as set forth in claim 3, wherein said robot further comprises a multi-articulated robot including a swivel base, a first arm having a base end thereof pivotally supported on said swivel base, a second arm having one end thereof pivotally connected to a fore end of said first arm, a wrist portion pivotally supported at a fore end of said second arm, and a plurality of gravity balancing units mounted on said first and second arms for offsetting gravitational moments thereof, said robot further comprising:
    parallel link means for interlocking a first shaft supporting the weight of said wrist portion with a second shaft serving as a pivoting shaft of said second arm; and
    counterweight means securely fixed to said second shaft for offsetting variations in the gravitational moment of said second arm caused by rotation of said wrist portion about said first shaft.

* * * * *